United States Patent
Ko

(10) Patent No.: US 10,235,094 B2
(45) Date of Patent: Mar. 19, 2019

(54) DATA WRITING METHOD, MEMORY CONTROL CIRCUIT UNIT AND MEMORY STORAGE APPARATUS

(71) Applicant: PHISON ELECTRONICS CORP., Miaoli (TW)

(72) Inventor: Bo-Cheng Ko, Taipei (TW)

(73) Assignee: PHISON ELECTRONICS CORP., Miaoli (TW)

( * ) Notice: Subject to any disclaimer, the term of this patent is extended or adjusted under 35 U.S.C. 154(b) by 0 days.

(21) Appl. No.: 15/060,622

(22) Filed: Mar. 4, 2016

(65) Prior Publication Data

US 2017/0192716 A1 Jul. 6, 2017

(30) Foreign Application Priority Data

Jan. 4, 2016 (TW) .............................. 105100023 A

(51) Int. Cl.
   *G06F 12/00* (2006.01)
   *G06F 3/06* (2006.01)

(52) U.S. Cl.
   CPC .......... *G06F 3/0652* (2013.01); *G06F 3/0608* (2013.01); *G06F 3/0653* (2013.01); *G06F 3/0659* (2013.01); *G06F 3/0688* (2013.01)

(58) Field of Classification Search
   CPC .... G06F 3/0652; G06F 3/0608; G06F 3/0653; G06F 3/0659; G06F 3/0688
   See application file for complete search history.

(56) References Cited

U.S. PATENT DOCUMENTS

| 2013/0054881 A1* | 2/2013 | Ellis | G06F 12/0246 711/103 |
| 2013/0061101 A1* | 3/2013 | Fitzpatrick | G11C 29/50004 714/718 |
| 2013/0173844 A1* | 7/2013 | Chen | G06F 12/0246 711/103 |
| 2013/0232296 A1* | 9/2013 | Yonezawa | G06F 12/0246 711/103 |
| 2015/0193302 A1* | 7/2015 | Hyun | G11C 29/52 714/764 |
| 2015/0261444 A1* | 9/2015 | Yoshii | G11C 11/5628 711/103 |

* cited by examiner

Primary Examiner — Prasith Thammavong
(74) Attorney, Agent, or Firm — JCIPRNET

(57) ABSTRACT

A data writing method, a memory control circuit unit, and a memory storage apparatus are provided. The method includes recording a flush command counting (FCC) value, and updating the FCC value whenever receiving a flush command from a host system. The method further includes getting a first physical erasing unit as an active physical unit and determining whether the FCC value is greater than a FCC value threshold. The method further includes setting a writing mode of the active physical unit as a first writing mode if the FCC value is greater than the FCC value threshold, and setting the writing mode of the active physical unit as a second writing mode if the FCC value is not greater than the FCC value threshold.

35 Claims, 7 Drawing Sheets

| lower physical programming units | middle physical programming units | upper physical programming units |
|---|---|---|
| 0 | 1 | 2 |
| 3 | 4 | 5 |
| 6 | 7 | 8 |
| 9 | 10 | 11 |
| 12 | 13 | 14 |
| ⋮ | ⋮ | ⋮ |
| 255 | 256 | 257 |

DATA WRITING METHOD, MEMORY CONTROL CIRCUIT UNIT AND MEMORY STORAGE APPARATUS

CROSS-REFERENCE TO RELATED APPLICATION

This application claims the priority benefit of Taiwan application serial no. 105100023, filed on Jan. 4, 2016. The entirety of the above-mentioned patent application is hereby incorporated by reference herein and made a part of this specification.

BACKGROUND

Technology Field

The present invention relates to a data writing method, and in particular, a data writing method for a rewritable non-volatile memory module and a memory control circuit unit and a memory storage apparatus using the method.

Description of Related Art

As digital cameras, mobile phones, and MP3 players have been growing rapidly in recent years, consumers' demand for storage media has also been growing significantly. With characteristics including data non-volatility, energy saving, small size, lack of mechanical structures, high reading/writing speed, etc., rewritable non-volatile memories are most suitable for portable electronic products, such as laptops. A solid state drive is a memory storage apparatus which utilizes a flash memory as its storage medium. Therefore, the flash memory industry has become a popular line among the electronics industries.

According to the number of bits that can be stored in each memory cell, the NAND flash memory may be classified into a single level cell (SLC) NAND flash memory, a multi level cell (MLC) NAND flash memory, and a trinary level cell (TLC) NAND flash memory. Specifically, each memory cell in the SLC NAND flash memory stores 1 bit of data (i.e., "1" or "0"), each memory cell in the MLC NAND flash memory stores 2 bits of data, and each memory cell in the TLC NAND flash memory stores three bits of data.

In the NAND flash memory, a physical programming unit is constituted by several memory cells arranged on a same word line. Since each memory cell in the SLC NAND flash memory is capable of storing 1 bit of data, the several memory cells arranged on the same word line in the SLC NAND flash memory correspond to one physical programming unit.

In contrast with the SLC NAND flash memory, a floating gate storage layer in each memory cell of the MLC NAND flash memory is capable of storing 2 bits of data, wherein each storage state (i.e., "11", "10", "01", and "00") includes the least significant bit (LSB) and the most significant bit (MSB). For example, in the storage state, the value of the first bit counted from the left is the LSB, and the value of the second bit counted from the left is the MSB. Accordingly, the several memory cells arranged on the same word line may constitute two physical programming units, wherein the physical programming unit constituted by the LSBs of the memory cells is referred to as a lower physical programming unit, and the physical programming unit constituted by the MSBs of the memory cells is referred to as an upper physical programming unit. In particular, the writing speed of the lower physical programming unit is faster than the writing speed of the upper physical programming unit, and when a failure occurs in the process of programming the upper physical programming unit, the data stored in the lower physical programming unit may be lost.

Similarly, each memory cell in the TLC NAND flash memory can store 3 bits of data, wherein each storage state (i.e., "111", "110", "101", "100", "011", "010", "001", or "000") includes the first bit (i.e., the LSB) counted from the left, the second bit (i.e., the center significant bit, CSB) counted from the left, and the third bit (i.e., the MSB) counted from the left. Accordingly, the several memory cells arranged on the same word line may constitute three physical programming units, wherein the physical programming unit constituted by the LSBs of the memory cells is referred to as a lower physical programming unit, the physical programming unit constituted by the CSBs of the memory cells is referred to as a middle physical programming unit, and the physical programming unit constituted by the MSBs of the memory cells is referred to as an upper physical programming unit. In particular, in the TLC NAND flash memory, to ensure that the data on a word line can be stably stored, it is necessary to program the word line for three times. For example, after performing a first programming on the memory cells on a first word line, the memory cells on the first word line are in a first state. When the memory cells on a second word line are programmed, the memory cells on the first word line are simultaneously programmed again. At this time, the memory cells on the first word line are in a foggy state. Then, when the memory cells on a third word line are programmed, the memory cells on the first and second word lines are simultaneously programmed again. At this time, the memory cells on the first word line are in a fine state. Furthermore, when the memory cells on a fourth word line are programmed, the memory cells on the second and third word lines are simultaneously programmed again. At this time, the memory cells on the second word line are in a fine state. Thereby, it can be ensured that the data in the memory cells on the first word line are stably stored. In light of the principle above, when a host system issues a flush command, to ensure that the data are already stably stored to the TLC NAND flash memory, a memory controller needs to further continue to program three other word lines. Each word line includes three physical programming units. Therefore, a memory control circuit needs to write virtual data to 9 physical programming units, which accordingly causes excessive redundant writings, lowers storage efficiency of the memory storage apparatus, and shortens the lifespan of the memory storage apparatus.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

The invention provides a data writing method, a memory control circuit unit, and a memory storage apparatus capable of adjusting a writing mode of physical erasing units according to a frequency of executing flush commands and thereby reducing writing of virtual data.

One exemplary embodiment provides a data writing method for a rewritable non-volatile memory module, wherein the rewritable non-volatile memory module includes a plurality of physical erasing units and each one of the physical erasing units includes a plurality of lower physical programming units and a plurality of upper physical programming units. The data writing method includes recording a flush command counting (FCC) value. The data writing method further includes getting a first physical erasing unit from the physical erasing units as an active physical unit and determining whether the FCC value is greater than a FCC value threshold. The data writing method also includes setting a writing mode of the active physical unit as a first writing mode if the FCC value is greater than the FCC value threshold, wherein each memory cell constituting the active physical unit stores a bit data of a first number in the first writing mode. The data writing method further includes setting the writing mode of the active physical unit as a second writing mode if the FCC value is not greater than the FCC value threshold, wherein each memory cell constituting the active physical unit stores a bit data of a second number in the second writing mode, wherein the first number is smaller than the second number.

One exemplary embodiment provides a memory control circuit unit configured to control a rewritable non-volatile memory module, including a host interface, a memory interface, and a memory management circuit. The host interface is configured to couple to a host system. The memory interface is configured to couple to the rewritable non-volatile memory module, wherein the rewritable non-volatile memory module includes a plurality of physical erasing units and each one of the physical erasing units includes a plurality of lower physical programming units and a plurality of upper physical programming units. The memory management circuit is coupled to the host interface and the memory interface and is configured to record a FCC value. Moreover, the memory management circuit is further configured to get a first physical erasing unit from the physical erasing units as an active physical unit and determine whether the FCC value is greater than a FCC value threshold. The memory management circuit sets a writing mode of the active physical unit as a first writing mode if the FCC value is greater than the FCC value threshold, wherein each memory cell constituting the active physical unit stores a bit data of a first number in the first writing mode. The memory management circuit sets the writing mode of the active physical unit as a second writing mode if the FCC value is not greater than the FCC value threshold, wherein each memory cell constituting the active physical unit stores a bit data of a second number in the second writing mode, wherein the first number is smaller than the second number.

One exemplary embodiment provides a memory storage apparatus including a connection interface unit, a rewritable non-volatile memory module, and a memory control circuit unit. The connection interface unit is configured to couple to a host system. The rewritable non-volatile memory module includes a plurality of physical erasing units, wherein each one of the physical erasing units includes a plurality of lower physical programming units and a plurality of upper physical programming units. The memory control circuit unit is coupled to the connection interface unit and the rewritable non-volatile memory module and is configured to record a FCC value. Moreover, the memory control circuit unit is further configured to get a first physical erasing unit from the physical erasing units as an active physical unit and determine whether the FCC value is greater than a FCC value threshold. The memory control circuit unit sets a writing mode of the active physical unit as a first writing mode if the FCC value is greater than the FCC value threshold, wherein each memory cell constituting the active physical unit stores a bit data of a first number in the first writing mode. The memory control circuit unit sets the writing mode of the active physical unit as a second writing mode if the FCC value is not greater than the FCC value threshold, wherein each memory cell constituting the active physical unit stores a bit data of a second number in the second writing mode, wherein the first number is smaller than the second number.

In light of the above, the data writing method, the memory control circuit unit, and the memory storage apparatus of the exemplary embodiments of the invention can effectively reduce the data amount of the virtual data written due to execution of the flush commands, and the lifespan of the rewritable non-volatile memory can thereby be extended.

It should be understood, however, that this Summary may not contain all of the aspects and embodiments of the present invention, is not meant to be limiting or restrictive in any manner, and that the present invention as disclosed herein is and will be understood by those of ordinary skill in the art to encompass obvious improvements and modifications thereto.

To provide a further understanding of the aforementioned and other features and advantages of the invention, exemplary embodiments, together with the reference drawings, are described in detail below.

BRIEF DESCRIPTION OF THE DRAWINGS

The accompanying drawings are included to provide a further understanding of the present invention, and are incorporated in and constitute a part of this specification. The drawings illustrate embodiments of the present invention and, together with the description, serve to explain the principles of the present invention.

DESCRIPTION OF THE EMBODIMENTS

Figure 1:
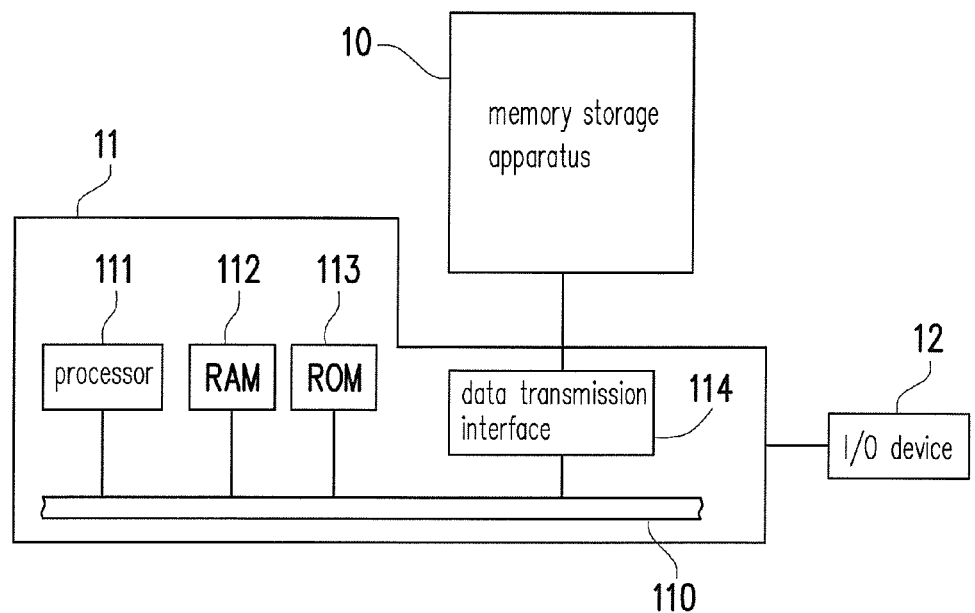
FIG. 1 is a schematic diagram illustrating a host system, a memory storage apparatus, and an input/output (I/O) device according to an exemplary embodiment.

Reference will now be made in detail to the exemplary embodiments of the invention, examples of which are illustrated in the accompanying drawings. Wherever possible, the same reference numbers are used in the drawings and the description to refer to the same or like parts.

Embodiments of the invention may comprise any one or more of the novel features described herein, including in the detailed description, and/or shown in the drawings. As used herein, "at least one," "one or more," and "and/or" are open-ended expressions that are both conjunctive and disjunctive in operation. For instance, each of the expressions "at least on of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more," and "at least one" can be used interchangeably herein.

Generally, a memory storage apparatus (also referred to as a memory storage system) includes a rewritable non-volatile memory module and a controller (also referred to as a control circuit unit). The memory storage apparatus is usually used together with a host system, such that the host system can write data to the memory storage apparatus or read data from the memory storage apparatus.

Figure 2:
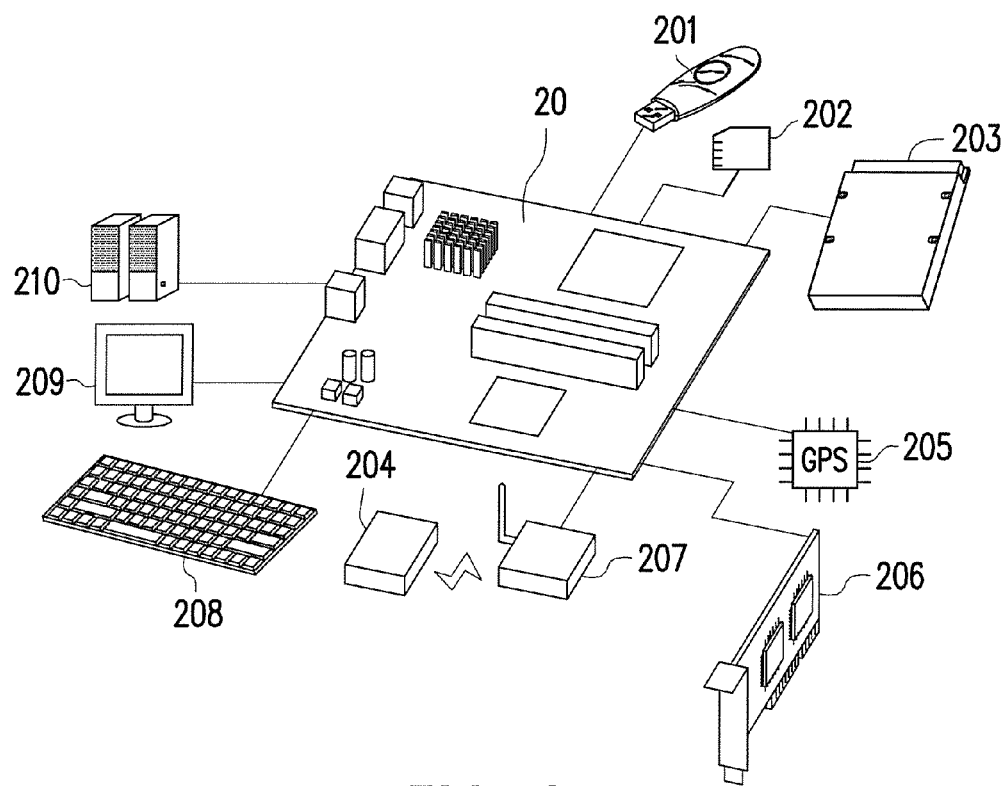
FIG. 2 is a schematic diagram illustrating a host system, a memory storage apparatus, and an I/O device according to another exemplary embodiment.

FIG. 1 is a schematic diagram illustrating a host system, a memory storage apparatus, and an input/output (I/O) device according to an exemplary embodiment. FIG. 2 is a schematic diagram illustrating a host system, a memory storage apparatus, and an I/O device according to another exemplary embodiment.

Referring to FIG. 1 and FIG. 2, a host system 11 generally includes a processor 111, a random access memory (RAM) 112, a read only memory (ROM) 113, and a data transmission interface 114. The processor 111, the random access memory 112, the read only memory 113, and the data transmission interface 114 are all coupled to a system bus 110.

In the present exemplary embodiment, the host system 11 is coupled to a memory storage apparatus 10 via the data transmission interface 114. For example, the host system 11 may write data to the memory storage apparatus 10 or read data from the memory storage apparatus 10 via the data transmission interface 114. Moreover, the host system 11 is coupled to the I/O device 12 via the system bus 110. For example, the host system 11 may transmit an output signal to the I/O device 12 or receive an input signal from the I/O device 12 via the system bus 110.

In the present exemplary embodiment, the processor 111, the random access memory 112, the read only memory 113, and the data transmission interface 114 may be installed on a motherboard 20 of the host system 11. The number of the data transmission interface 114 may be one or more. The motherboard 20 may be coupled to the memory storage apparatus 10 via the data transmission interface 114 through wired or wireless methods. The memory storage apparatus 10 is, for example, a flash drive 201, a memory card 202, a solid state drive (SSD) 203, or a wireless memory storage apparatus 204. The wireless memory storage apparatus 204 is a memory storage apparatus based on various wireless communication technologies, such as a near field communication (NFC) memory storage apparatus, a WiFi memory storage apparatus, a Bluetooth memory storage apparatus, or a low power Bluetooth memory storage apparatus (e.g., iBeacon). Moreover, the motherboard 20 may also be coupled via the system bus 110 to various I/O devices, such as a global positioning system (GPS) module 205, a network interface card 206, a wireless transmission device 207, a keyboard 208, a screen 209, and a speaker 210. For example, in one exemplary embodiment, the motherboard 20 may access the wireless memory storage apparatus 204 via the wireless transmission device 207.

Figure 3:
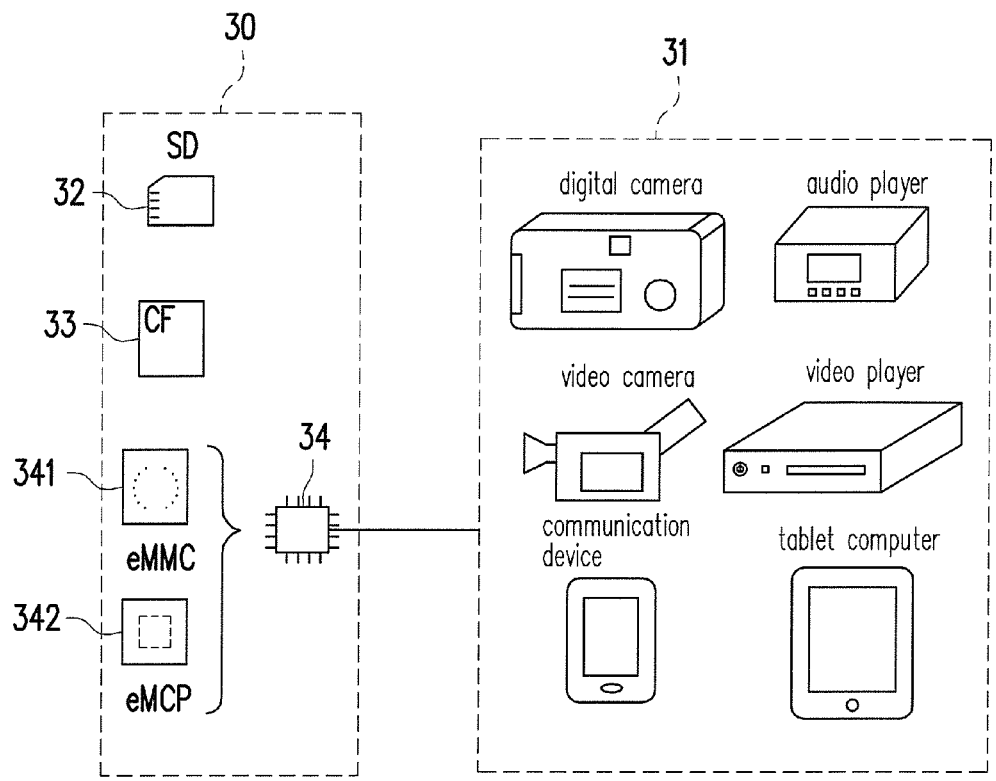
FIG. 3 is a schematic diagram illustrating a host system and a memory storage apparatus according to an exemplary embodiment of the invention.

In one exemplary embodiment, the foregoing host system is any system that substantially works with the memory storage apparatus to store data. In the exemplary embodiment above, the host system is illustrated with a computer system. However, FIG. 3 is a schematic diagram illustrating a host system and a memory storage apparatus according to another exemplary embodiment. Referring to FIG. 3, in another exemplary embodiment, a host system 31 may also be a system such as a digital camera, a video camera, a communication device, an audio player, a video player, a tablet computer, etc. A memory storage apparatus 30 is any of various types of non-volatile memory storage apparatuses used thereby, such as an SD card 32, a CF card 33, an embedded storage apparatus 34, etc. The embedded storage apparatus 34 is any of various types of embedded storage apparatuses directly coupling a memory module to a substrate of the host system, such as an embedded MMC (eMMC) 341 and/or an embedded multi chip package (eMCP) 342.

Figure 4:
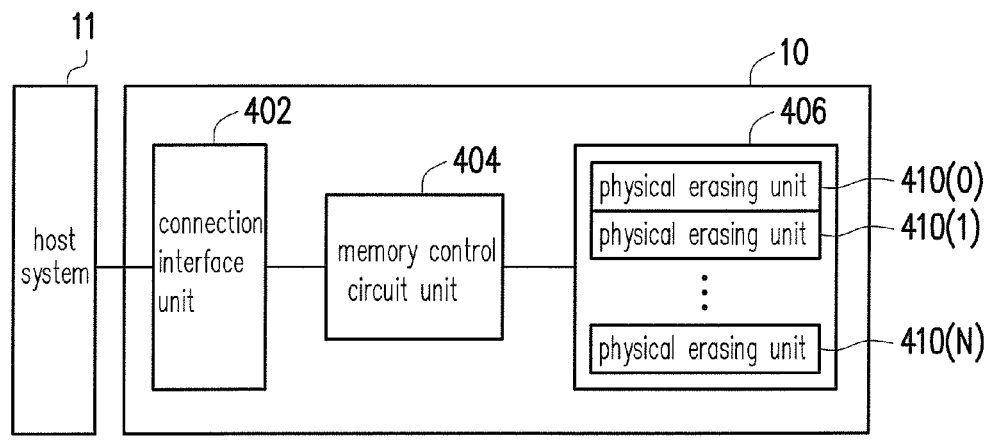
FIG. 4 is a schematic block diagram illustrating a host system and a memory storage apparatus according to an exemplary embodiment.

FIG. 4 is a schematic block diagram illustrating a host system and a memory storage apparatus according to an exemplary embodiment.

Referring to FIG. 4, the memory storage apparatus 10 includes a connection interface unit 402, a memory control circuit unit 404, and a rewritable non-volatile memory module 406.

In the present exemplary embodiment, the connection interface unit 402 is compatible with the Serial Advanced Technology Attachment (SATA) standard. However, it should be understood that the invention is not limited hereto. The connection interface unit 402 may also meet the Parallel Advanced Technology Attachment (PATA) standard, the Institute of Electrical and Electronic Engineers (IEEE) 1394 standard, the Peripheral Component Interconnect Express (PCI Express) standard, the Universal Serial Bus (USB) standard, the Ultra High Speed-I (UHS-I) interface standard, the Ultra High Speed-II (UHS-II) interface standard, the Secure Digital (SD) interface standard, the Memory Stick (MS) interface standard, the Multi-Chip Package interface standard, the Multi Media Card (MMC) interface standard, the Embedded Multimedia Card (eMMC) interface standard, the Universal Flash Storage (UFS) interface standard, the embedded Multi Chip Package (eMCP) interface standard, the Compact Flash (CF) interface standard, the Integrated Device Electronics (IDE) standard, or other suitable standards. In the present exemplary embodiment, the connection interface unit 402 may be packaged with the memory control circuit unit 404 in one single chip, or the connection interface unit 402 is provided exterior to a chip including the memory control circuit unit 404.

The memory control circuit unit 404 is configured to execute a plurality of logic gates or control instructions implemented in a hardware form or a firmware form and perform operations according to commands of the host system 11, such as data writing, reading, erasing, etc., in the rewritable non-volatile memory module 406.

The rewritable non-volatile memory module 406 is coupled to the memory control circuit unit 404 and is configured to store the data written by the host system 11. The rewritable non-volatile memory module 406 includes physical erasing units 410(0) to 410(N). For example, the physical erasing units 410(0) to 410(N) may belong to one single memory die or belong to different memory dies. Each physical erasing unit respectively includes a plurality of physical programming units, wherein the physical programming units belonging to the same physical erasing unit may be written independently and erased simultaneously. However, it should be understood that the invention is not limited hereto, and each physical erasing unit may also be constituted by 64 physical programming units, 256 physical programming units, or physical programming units of any other numbers.

More specifically, the physical erasing unit is the smallest unit for erasing. Namely, each physical erasing unit includes the least number of memory cells that are erased all together. The physical programming unit is the smallest unit for programming. Namely, the physical programming unit is the smallest unit for writing data. Each physical programming unit usually includes a data bit area and a redundant bit area. The data bit area includes a plurality of physical access addresses for storing user data, and the redundant bit area is configured for storing system data (e.g., control information and error correcting codes). In the present exemplary embodiment, each data bit area of the physical programming unit includes 8 physical access addresses, and the size of each physical access address is 512 bytes. However, in other exemplary embodiments, greater or smaller numbers of the physical access addresses may be included in the data bit area, and the size and the number of the physical access addresses are not limited in the invention. For example, in an exemplary embodiment, the physical erasing units are physical blocks, and the physical programming units are physical pages or physical sectors, but the invention is not limited hereto.

In the present exemplary embodiment, the rewritable non-volatile memory module 406 is a trinary level cell (TLC) NAND flash memory module (i.e., a flash memory module capable of storing 3 data bits in one memory cell). However, the invention is not limited hereto, and the rewritable non-volatile memory module 406 may also be a multi level cell (MLC) NAND flash memory module (i.e., a flash memory module capable of storing 2 data bits in one memory cell), or any other memory modules with the same characteristics.

Figures 5A, 5B:
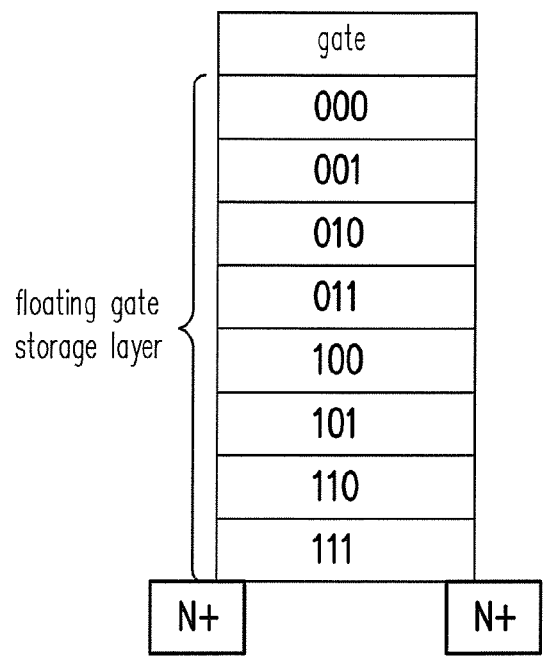
FIG. 5A and FIG. 5B are schematic diagrams illustrating a storage structure of a memory cell and physical erasing units according to an exemplary embodiment.

FIG. 5A and FIG. 5B are exemplary schematic diagrams illustrating a storage structure of a memory cell and physical erasing units according to an exemplary embodiment.

Referring to FIG. 5A, a storage state of each memory cell of the rewritable non-volatile memory module 406 can be recognized as "111", "110", "101", "100", "011", "010", "001" or "000" (as illustrated in FIG. 3A), wherein a first bit counted from the left is a least significant bit (LSB), a second bit counted from the left is a center significant bit (CSB), and a third bit counted from the left is a most significant bit (MSB). Moreover, a plurality of memory cells arranged on a same word line may constitute 3 physical programming units, wherein the physical programming unit constituted by the LSBs of the memory cells is referred to as a lower physical programming unit, the physical programming unit constituted by the CSBs of the memory cells is referred to as a middle physical programming unit, and the physical programming unit constituted by the MSBs of the memory cells is referred to as an upper physical programming unit.

Referring to FIG. 5B, a physical erasing unit is constituted by a plurality of physical programming unit groups, wherein each physical programming unit group includes a lower physical programming unit, a middle physical programming unit, and an upper physical programming unit constituted by a plurality of memory cells arranged on a same word line. For example, in the physical erasing unit, a $0^{th}$ physical programming unit belonging to the lower physical programming unit, a $1^{st}$ physical programming unit belonging to the middle physical programming unit, and a $2^{nd}$ physical programming unit belonging to the upper physical programming unit are regarded as one physical programming unit group. Similarly, the $3^{rd}$, $4^{th}$, and $5^{th}$ physical programming units are regarded as one physical programming unit group, and, by analogy, the other physical programming units are also grouped into a plurality of physical programming unit groups according to such manner.

Figure 6:
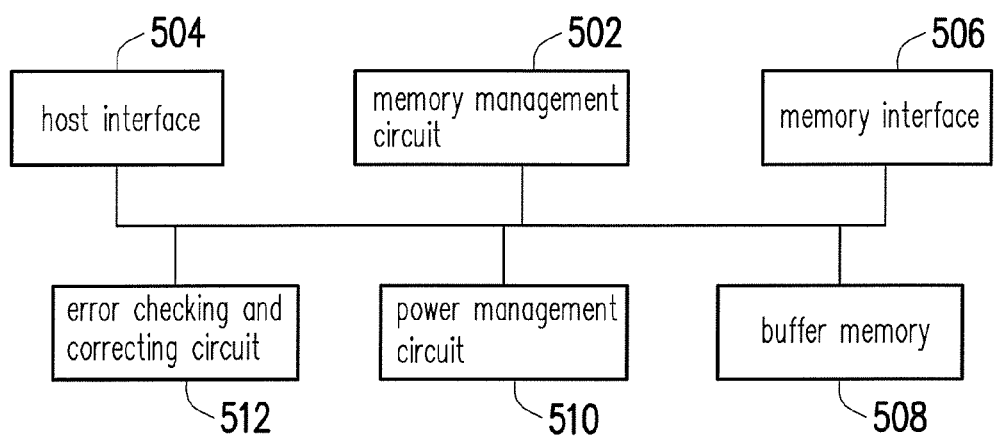
FIG. 6 is a schematic block diagram illustrating a memory control circuit unit according to an exemplary embodiment.

FIG. 6 is a schematic block diagram illustrating a memory control circuit unit according to an exemplary embodiment.

Referring to FIG. 6, a memory control circuit unit 404 includes a memory management circuit 502, a host interface 504, a memory interface 506, a buffer memory 508, a power management circuit 510, and an error checking and correcting (ECC) circuit 512.

The memory management circuit 502 is configured to control an overall operation of the memory control circuit unit 404. Specifically, the memory management circuit 502 includes a plurality of control instructions, and when the memory storage apparatus 10 is operating, the control instructions are executed to perform operations of data writing, reading, erasing, etc.

In the present exemplary embodiment, the control instructions of the memory management circuit 502 are implemented in a firmware form. For example, the memory management circuit 502 includes a microprocessor unit (not illustrated) and a read only memory (not illustrated), wherein the control instructions are burnt in the read only memory. When the memory storage apparatus 10 is operating, the control instructions are executed by the microprocessor unit to perform operations of data writing, reading, erasing, etc.

Figure 7:
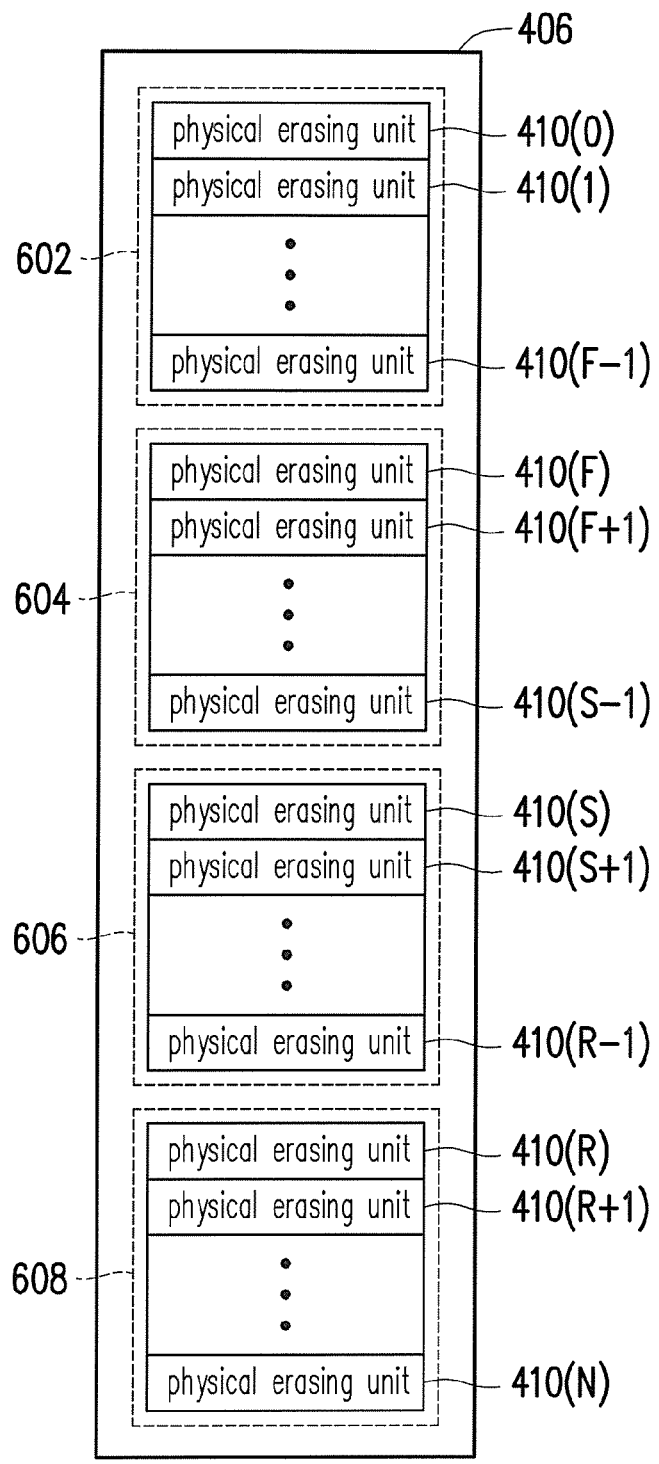
FIG. 7 and FIG. 8 are exemplary schematic diagrams illustrating management of physical erasing units according to an exemplary embodiment.
Figure 8:
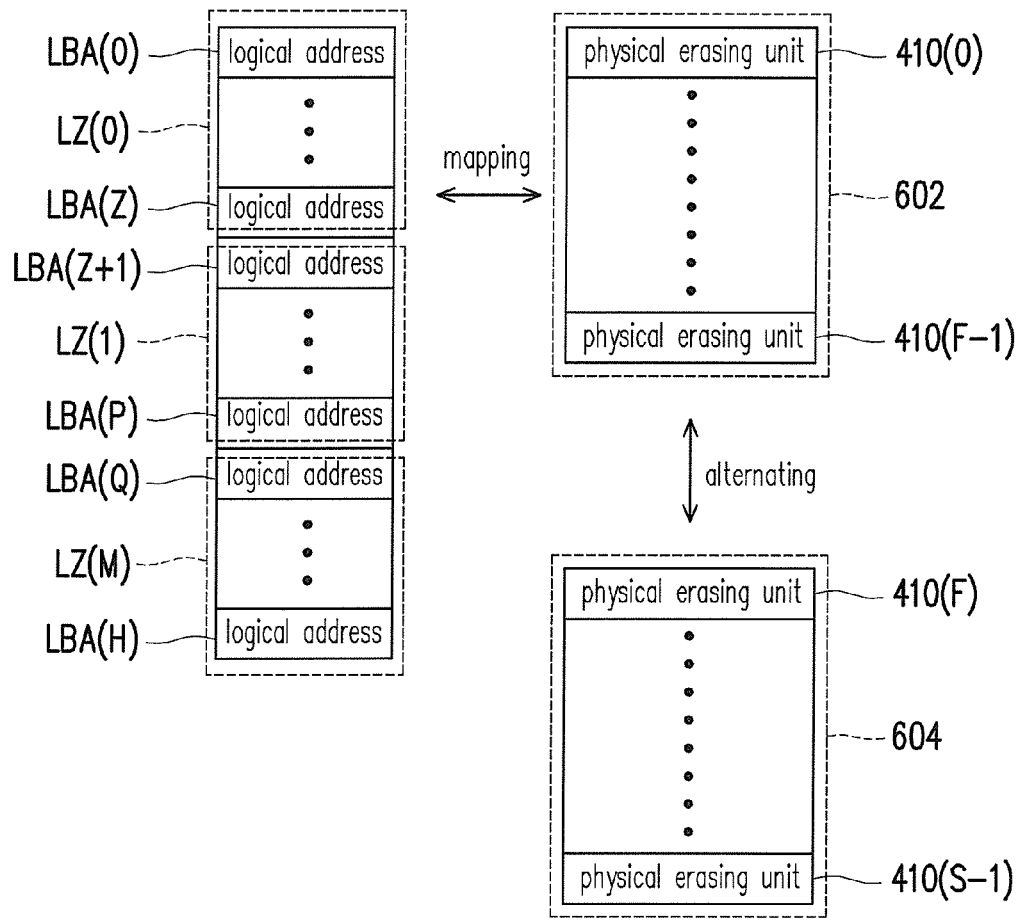

FIG. 7 and FIG. 8 are exemplary schematic diagrams illustrating management of physical erasing units according to an exemplary embodiment.

It should be understood that in the description here of operations of the physical erasing units of the rewritable non-volatile memory module 406, the terms such as "get", "group", "divide", "associate", etc. in connection with operations of the physical erasing units are logical concepts. That is, actual positions of the physical erasing units of the rewritable non-volatile memory module are not changed, but the physical erasing units of the rewritable non-volatile memory module are logically operated.

Referring to FIG. 7, the memory control circuit unit 404 (or the memory management circuit 502) logically groups the physical erasing units 410(0) to 410(N) into a data area 602, a spare area 604, a system area 606, and a replacement area 608.

The physical erasing units logically belonging to the data area 602 and the spare area 604 are configured to store data from the host system 11. Specifically, the physical erasing units of the data area 602 are regarded as the physical erasing units already storing data, and the physical erasing units of the spare area 604 are configured to substitute for the physical erasing units of the data area 602. Namely, when a write command and data to be written are received from the host system 11, the memory management circuit 502 gets physical erasing units from the spare area 604 for writing data so as to substitute for the physical erasing units of the data area 602.

The physical erasing units logically belonging to the system area 606 are configured to record system data. For example, the system data includes the manufacturers and models of the rewritable non-volatile memory module, the number of physical erasing units of the rewritable non-volatile memory module, the number of physical programming units of each physical erasing unit, etc.

The physical erasing units logically belonging to the replacement area 608 are used in a bad physical erasing unit replacement procedure for replacing damaged physical erasing units. Specifically, if there still exist normal physical erasing units in the replacement area 608 and the physical erasing units of the data area 602 are damaged, the memory management circuit 502 gets normal physical erasing units from the replacement area 608 to replace the damaged physical erasing units.

In particular, the numbers of physical erasing units of the data area 602, the spare area 604, the system area 606, and the replacement area 608 vary according to different specifications of the memory. Moreover, it should be understood that the grouping relations of associating the physical erasing units with the data area 602, the spare area 604, the system area 606, and the replacement area 608 are dynamically changed during the operation of the memory storage apparatus 10. For example, when the physical erasing units in the spare area 604 are damaged and replaced by the physical erasing units of the replacement area 608, the physical erasing units originally in the replacement area 608 are associated with the spare area 604.

Referring to FIG. 8, the memory control circuit unit 404 (or the memory management circuit 502) configures logical addresses LBA(0) to LBA(H) to map to the physical erasing units of the data area 602, wherein each logical address includes a plurality of logical units to map to the physical programming units of the corresponding physical erasing units. Moreover, when the host system 11 is to write data to the logical addresses or update data stored in the logical addresses, the memory control circuit unit 404 (or the memory management circuit 502) gets a physical erasing unit from the spare area 604 as an active physical unit for writing data so as to alternate the physical erasing units of the data area 602. In addition, when the physical erasing unit as the active physical unit is fully written, the memory control circuit unit 404 (or the memory management circuit 502) gets empty physical erasing units from the spare area 504 as active physical units to continue writing update data corresponding to the write command from the host system 11. In addition, when the number of the physical erasing units available in the spare area 604 is smaller than a predetermined value, the memory control circuit unit 404 (or the memory management circuit 502) executes a valid data merge procedure (also referred to as a garbage collecting procedure) to organize valid data in the data area 602 and re-associate the physical erasing units not stored with the valid data in the data area 602 to the spare area 604.

To identify in which physical erasing units the data of each logical address is stored, in the present exemplary embodiment, the memory control circuit unit 404 (or the memory management circuit 502) records mappings between the logical addresses and the physical erasing units. For example, in the present exemplary embodiment, the memory control circuit unit 404 (or the memory management circuit 502) stores a logical address-physical address mapping table in the rewritable non-volatile memory module 406 to record the physical erasing unit mapped to each logical address. When data is to be accessed, the memory control circuit unit 404 (or the memory management circuit 502) loads the logical address-physical address mapping table to the buffer memory 508 for maintenance and writes or reads data according to the logical address-physical address mapping table.

It should be mentioned that due to limited capacity, the buffer memory 508 is unable to store the mapping tables recording the mapping relations of all logical addresses. Therefore, in the present exemplary embodiment, the memory control circuit unit 404 (or the memory management circuit 502) groups the logical addresses LBA(0) to LBA(H) into a plurality of logical zones LZ(0) to LZ(M) and allocates one logical address-physical address mapping table to each logical zone. Particularly, if the memory control circuit unit 404 (or the memory management circuit 502) is to update the mapping of one certain logical address, the logical address-physical address mapping table corresponding to the logical zone of the logical address is loaded to the buffer memory 508 to be updated.

In another exemplary embodiment, the control instructions of the memory management circuit 502 may also be stored in the form of codes in specific areas (e.g., a system area exclusively used for storing system data in a memory module) of the rewritable non-volatile memory module 406. Moreover, the memory management circuit 502 includes a microprocessor unit (not illustrated), a read only memory (not illustrated), and a random access memory (not illustrated). Particularly, the read only memory includes a boot code, and when the memory control circuit unit 404 is enabled, the microprocessor unit first executes the boot code segment to load the control instructions stored in the rewritable non-volatile memory module 406 to the random access memory of the memory management circuit 502. Afterwards, the microprocessor unit operates the control instructions to perform operations of data writing, reading, erasing, etc.

Furthermore, in another exemplary embodiment of the invention, the control instructions of the memory management circuit 502 may also be implemented in a hardware form. For example, the memory management circuit 502 includes a micro controller, a memory cell management circuit, a memory writing circuit, a memory reading circuit, a memory erasing circuit, and a data processing circuit. The memory cell management circuit, the memory writing circuit, the memory reading circuit, the memory erasing circuit, and the data processing circuit are coupled to the micro controller. Specifically, the memory cell management circuit is configured to manage the physical erasing units of the rewritable non-volatile memory module 406. The memory writing circuit is configured to issue a write command to the rewritable non-volatile memory module 406 for writing data to the rewritable non-volatile memory module 406. The memory reading circuit is configured to issue a read command to the rewritable non-volatile memory module 406 for reading data from the rewritable non-volatile memory module 406. The memory erasing circuit is configured to issue an erase command to the rewritable non-volatile memory module 406 for erasing data from the rewritable non-volatile memory module 406. The data processing circuit is configured to process data to be written to the rewritable non-volatile memory module 406 and data read from the rewritable non-volatile memory module 406.

Referring to FIG. 6 again, the host interface 504 is coupled to the memory management circuit 502 and is configured to couple to the connection interface unit 402 to receive and identify the commands and the data transmitted by the host system 11. In other words, the commands and the data transmitted by the host system 11 are transmitted to the memory management circuit 502 via the host interface 504. In the present exemplary embodiment, the host interface 504 is compatible with the SATA standard. However, it should be understood that the invention is not limited hereto, and the host interface 504 may also be compatible with the PATA standard, the IEEE 1394 standard, the PCI Express standard, the USB standard, the UHS-I interface standard, the UHS-II interface standard, the SD standard, the MS standard, the MMC standard, the CF standard, the IDE standard, or other suitable data transmission standards.

The memory interface 506 is coupled to the memory management circuit 502 and is configured to access the rewritable non-volatile memory module 406. In other words, data to be written to the rewritable non-volatile memory module 406 is converted into a format acceptable by the rewritable non-volatile memory module 406 through the memory interface 506.

The buffer memory 508 is coupled to the memory management circuit 502 and is configured to temporarily store the data and the commands from the host system 11 or the data from the rewritable non-volatile memory module 406.

The power management circuit 510 is coupled to the memory management circuit 502 and is configured to control the power of the memory storage apparatus 10.

The error checking and correcting circuit 512 is coupled to the memory management circuit 502 and is configured to execute an error checking and correcting procedure to ensure correctness of the data. Specifically, when the memory management circuit 502 receives a write command from the host system 11, the error checking and correcting circuit 512 generates an error checking and correcting code (ECC Code) for the data corresponding to the write command, and the memory management circuit 502 writes the data corresponding to the write command and the corresponding error checking and correcting code to the rewritable non-volatile memory module 406. Afterwards, when reading the data from the rewritable non-volatile memory module 406, the memory management circuit 502 simultaneously reads the error checking and correcting code corresponding to the data, and the error checking and correcting circuit 512 executes the error checking and correcting procedure on the read data according to the error checking and correcting code.

In the present exemplary embodiment, the memory control circuit unit 404 (or the memory management circuit 502) records a flush command counting (FCC) value. Whenever receiving a flush command from the host system 11, the memory control circuit unit 404 (or the memory management circuit 502) updates the FCC value. For example, the memory control circuit unit 404 (or the memory management circuit 502) adds 1 to the current FCC value as the updated FCC value.

In particular, whenever an active physical unit is fully stored with data and another physical erasing unit is gotten from the spare area 604 as a new active physical unit, the memory control circuit unit 404 (or the memory management circuit 502) determines whether the FCC value is greater than a FCC value threshold. If the FCC value is greater than the FCC value threshold, the memory control circuit unit 404 (or the memory management circuit 502) sets a writing mode of the current active physical unit as a first writing mode. On the other hand, if the FCC value is not greater than the FCC value threshold, the memory control circuit unit 404 (or the memory management circuit 502) sets the writing mode of the current active physical unit as a second writing mode. After setting the writing mode of the current active physical unit, the memory control circuit unit 404 (or the memory management circuit 502) resets the FCC value. For example, the memory control circuit unit 404 (or the memory management circuit 502) resets the value of the FCC value as 0. In other words, in the present exemplary embodiment, whenever a new active physical unit is substituted, the memory control circuit unit 404 (or the memory management circuit 502) determines the writing mode of the current active physical unit according to the current FCC value.

Here, the first writing mode refers to a programming mode of storing a bit data in a memory cell. For example, in the first writing mode, the memory control circuit unit 404 (or the memory management circuit 502) programs the memory cells constituting the active physical unit in a single layer memory cell (SLC) mode, a lower physical programming mode, a mixture programming mode, or a less layer memory cell mode. In other words, in the first writing mode, the memory control circuit unit 404 (or the memory management circuit 502) performs a data writing operation on the lower physical programming unit only. Therefore, only one third of the capacity of a physical erasing unit programmed in the first writing mode is used.

The second writing mode refers to a programming mode of storing multiple bits in a memory cell. For example, in the second writing mode, the memory control circuit unit 404 (or the memory management circuit 502) programs the memory cells constituting the active physical unit in a multi level cell (MLC) programming mode, a trinary level cell (TLC) programming mode, or a similar mode. In other words, when writing data in the second writing mode, the memory control circuit unit 404 (or the memory management circuit 502) performs a data writing operation based on one physical programming unit group. It should be mentioned that compared with a physical erasing unit operated in the first writing mode, a physical erasing unit operated in the second writing mode has a shorter lifespan. Specifically, the number of times of writing or erasing of each physical erasing unit is limited. When the number of times of writing of a physical erasing unit exceeds a threshold, this physical erasing unit may be damaged and cannot be written with data any more. In particular, a threshold corresponding to the physical erasing unit operated in the second writing mode is lower than a threshold corresponding to the physical erasing unit operated in the first writing mode.

As mentioned above, in the present exemplary embodiment, when the FCC value is greater than the FCC value threshold, the memory control circuit unit 404 (or the memory management circuit 502) sets the writing mode of the new active physical unit as the first writing mode, such that when later receiving the flush command, the memory control circuit unit 404 (or the memory management circuit 502) only writes virtual data to the lower physical programming units on the next three word lines. Accordingly, a data amount of the virtual data programmed to the rewritable non-volatile memory module 406 can be greatly reduced.

Figures 9A, 9B:
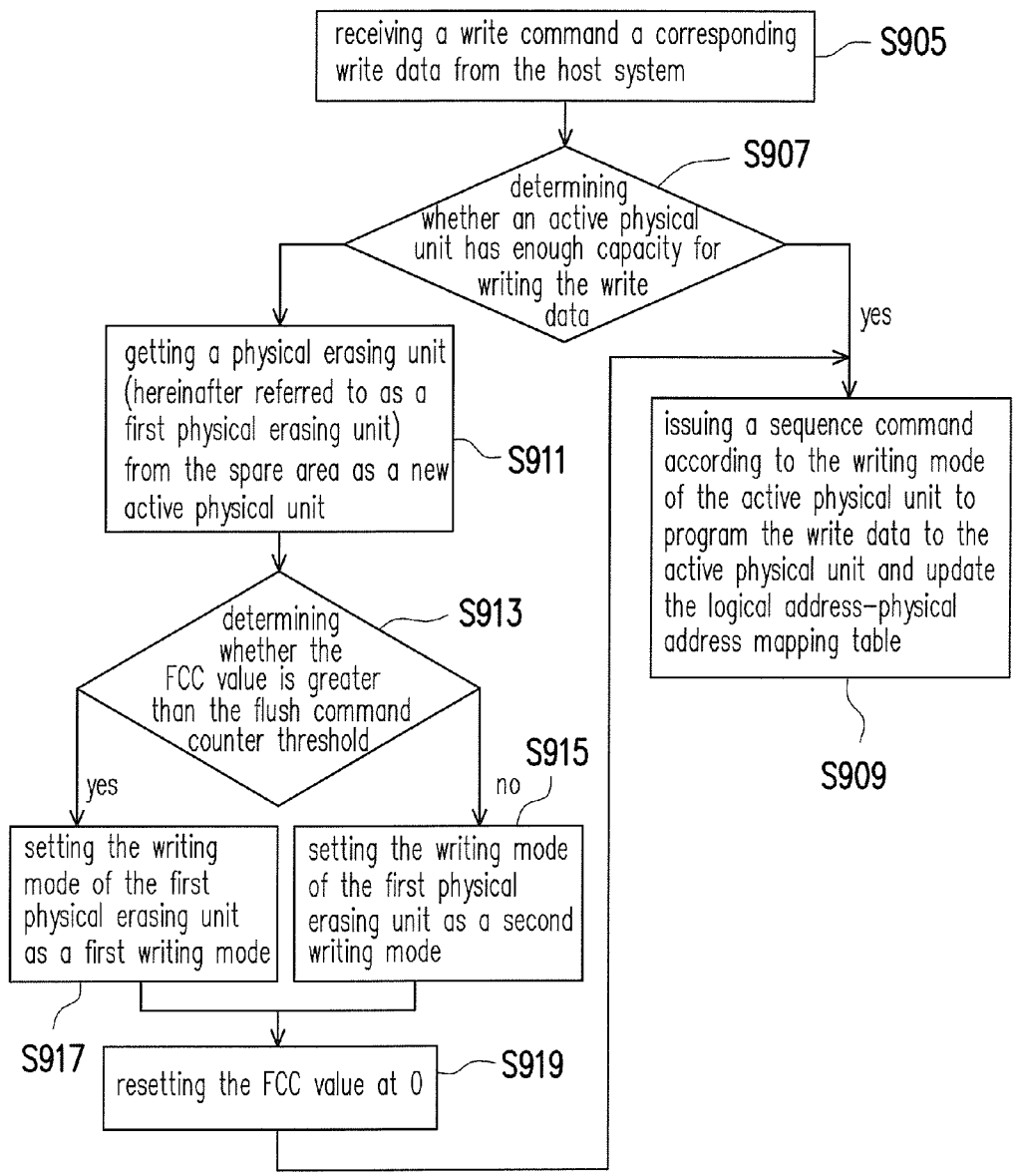
FIG. 9A and FIG. 9B are flowchart diagrams illustrating a data writing method according to an exemplary embodiment.

FIG. 9A and FIG. 9B are flowchart diagrams illustrating a data writing method according to an exemplary embodiment.

Referring to FIG. 9A, in step S901, when the memory storage apparatus 100 is power-on, the memory control circuit unit 404 (or the memory management circuit 502) establishes a FCC value and sets it at 0. In step S903, whenever receiving a flush command from the host system 11, the memory control circuit unit 404 (or the memory management circuit 502) updates the FCC value (for example, adding 1 to the value of the FCC value).

Referring to FIG. 9B, in step S905, the memory control circuit unit 404 (or the memory management circuit 502) receives a write command a corresponding write data from the host system 11.

In step S907, the memory control circuit unit 404 (or the memory management circuit 502) determines whether an active physical unit has enough capacity for writing the write data.

If the active physical unit has enough capacity for writing the write data, in step S909, the memory control circuit unit 404 (or the memory management circuit 502) issues a sequence command according to a writing mode of the active physical unit to program the write data to the active physical unit and update the logical address-physical address mapping table.

If the active physical unit does not have enough capacity for writing the write data, in step S911, the memory control circuit unit 404 (or the memory management circuit 502) gets a physical erasing unit (hereinafter referred to as a first physical erasing unit) from the spare area 604 as a new active physical unit. Afterwards, in step S913, the memory control circuit unit 404 (or the memory management circuit 502) determines whether the FCC value is greater than the FCC value threshold.

If the FCC value is not greater than the FCC value threshold, in step S915, the memory control circuit unit 404 (or the memory management circuit 502) sets the writing mode of the first physical erasing unit as a second writing mode. If the FCC value is greater than the FCC value threshold, in step S917, the memory control circuit unit 404 (or the memory management circuit 502) sets the writing mode of the first physical erasing unit as the first writing mode. Afterwards, in step S919, the memory control circuit unit 404 (or the memory management circuit 502) resets the FCC value at 0. Then, step S909 is executed for programming data.

It should be mentioned that in the present exemplary embodiment, the FCC value threshold is a fixed value, and after setting the writing mode of the active physical unit, the memory control circuit unit 404 (or the memory management circuit 502) resets the FCC value, such that whenever a physical erasing unit is used up, the number of the received flush commands is recalculated to determine whether to adopt the first writing mode or second writing mode in the next active physical unit. However, the present invention is not limited hereto. In another exemplary embodiment, the memory control circuit unit 404 (or the memory management circuit 502) continues counting of the FCC value without resetting the FCC value, and adjusts the writing mode of the active physical unit when the FCC value reaches a multiple of a predetermined value.

It should be mentioned that in the present exemplary embodiment, the FCC value threshold is a pre-calculated fixed value. In one example, the capacity of a physical erasing unit is 384 megabyte (MB) and the capacity of the memory cells on each word line is 3 MB. In the process of programming an active physical unit, the data amount of the written virtual data is the FCC value multiplied by 3 MB, and a host write data amount is the capacity of the active physical unit (namely, an actual programming data amount) subtracted by the data amount of the written virtual data. A value (also referred to as write amplification) obtained from dividing the actual programming data amount by the host write data amount can be used to measure whether the rewritable non-volatile memory module 406 has excessive redundant writing. Greater write amplification values mean more redundant writing and a shorter lifespan of the rewritable non-volatile memory module 406. If a user sets a tolerable write amplification value at 1.2, the memory control circuit unit 404 (or the memory management circuit 502) calculates that the FCC value has to be smaller than 7 (namely, 1.2<(384 MB/(384 MB−FCC value×9 MB). Therefore, the memory control circuit unit 404 (or the memory management circuit 502) fixedly sets the FCC value threshold at 7.

However, it should be understood that in the present exemplary embodiment, the FCC value threshold may also be dynamically determined when the memory storage apparatus 100 is operating. For example, the memory control circuit unit 404 (or the memory management circuit 502) can actually measure the amount of write data received from the host system 11 and the data amount actually written to the rewritable non-volatile memory module 406 during a period of time, and thereby calculate the current write amplification value. In particular, if the current write amplification value is greater than the tolerable write amplification value, the memory control circuit unit 404 (or the memory management circuit 502) lowers the FCC value threshold (for example, subtracting 1 from the current FCC value threshold) and thereby reduces the virtual data written due to execution of the flush commands.

In the exemplary embodiment above, the memory control circuit unit 404 (or the memory management circuit 502) performs the writing operations in units of physical erasing units. However, it should be understood that the present invention is not limited hereto. In another exemplary embodiment, the memory control circuit unit 404 (or the memory management circuit 502) groups the physical erasing units into a plurality of super physical units for management, and each super physical unit includes at least two physical erasing units. For example, when the host system issues a write command, the memory control circuit unit 404 (or the memory management circuit 502) uses a super physical unit for programming data. For example, the at least two physical erasing units in a super physical unit are different operating units (e.g., belonging to different planes or dies), such that they can be programmed simultaneously or alternately. In this example, the memory control circuit unit 404 (or the memory management circuit 502) uses a super physical unit as an active physical unit. When the super physical unit as the active physical unit is fully written, the memory control circuit unit 404 (or the memory management circuit 502) then resets the FCC value. In other words, the memory control circuit unit 404 (or the memory management circuit 502) calculates the number of flush commands received during a period of fully writing a super physical unit and thereby determines the writing mode for executing writing operations on the next super physical unit.

In summary of the above, the data writing method, the memory control circuit unit, and the memory storage apparatus of the exemplary embodiments of the invention can adjust the writing mode of the physical erasing units according to the frequency of executing the flush commands and reduce the data amount of the virtual data written to the rewritable non-volatile memory module. Thereby, the lifespan of the rewritable non-volatile memory module can be extended. The previously described exemplary embodiments of the present invention have the advantages aforementioned, wherein the advantages aforementioned not required in all versions of the invention.

Although the invention is disclosed as the embodiments above, the embodiments are not meant to limit the invention. Any person skilled in the art may make slight modifications and variations without departing from the spirit and scope of the invention. Therefore, the protection scope of the invention shall be defined by the claims attached below.

What is claimed is:

1. A data writing method for a rewritable non-volatile memory module, wherein the rewritable non-volatile memory module comprises a plurality of physical erasing units and each one of the physical erasing units comprises a plurality of lower physical programming units and a plurality of upper physical programming units, the data writing method comprising:

recording a flush command counting (FCC) value;
getting a first physical erasing unit from the physical erasing units as an active physical unit;
determining whether the FCC value is greater than a FCC value threshold;
setting a writing mode of the active physical unit as a first writing mode if the FCC value is greater than the FCC value threshold, wherein each memory cell constituting the active physical unit stores a bit data of a first number in the first writing mode; and
setting the writing mode of the active physical unit as a second writing mode if the FCC value is not greater than the FCC value threshold, wherein each memory cell constituting the active physical unit stores a bit data of a second number in the second writing mode, wherein the first number is smaller than the second number.

2. The data writing method according to claim 1, wherein the step of recording the FCC value comprises:
updating the FCC value whenever receiving a flush command from a host system.

3. The data writing method according to claim 2, wherein the step of recording the FCC value further comprises:
resetting the FCC value after setting the writing mode of the active physical unit.

4. The data writing method according to claim 2, wherein the step of updating the FCC value comprises adding 1 to the FCC value and the step of resetting the FCC value comprises setting the FCC value at 0.

5. The data writing method according to claim 2, wherein the step of getting the first physical erasing unit from the physical erasing units as the active physical unit comprises:
getting a super physical unit constituted by the first physical erasing unit and at least another physical erasing unit from the physical erasing units as the active physical unit,
wherein the step of recording the FCC value further comprises: resetting the FCC value after the super physical unit is fully written.

6. The data writing method according to claim 1, further comprising:
receiving a write command and a write data corresponding to the write command from the host system; and
programming the write data to the active physical unit according to the writing mode of the active physical unit.

7. The data writing method according to claim 1, further comprising:
logically grouping the physical erasing units at least into a data area and a spare area,
wherein the step of getting the first physical erasing unit from the physical erasing units as the active physical unit comprises: getting the first physical erasing unit from the spare area as the active physical unit.

8. The data writing method according to claim 1, wherein each one of the physical erasing units further comprises a plurality of middle physical programming units.

9. The data writing method according to claim 1, further comprising:
dynamically adjusting the FCC value threshold according to a host write data amount and an actual programming data amount.

10. The data writing method according to claim 9, wherein the step of dynamically adjusting the FCC value threshold according to the host write data amount and the actual programming data amount comprises:
lowering the FCC value threshold when a value obtained from dividing the actual programming data amount by the host write data amount increases.

11. A memory control circuit unit for controlling a rewritable non-volatile memory module, the memory control circuit unit comprising:
a host interface configured to couple to a host system;
a memory interface configured to couple to the rewritable non-volatile memory module, wherein the rewritable non-volatile memory module comprises a plurality of physical erasing units and each one of the physical erasing units comprises a plurality of lower physical programming units and a plurality of upper physical programming units; and
a memory management circuit coupled to the host interface and the memory interface and configured to record a FCC value,
wherein the memory management circuit is further configured to get a first physical erasing unit from the physical erasing units as an active physical unit and determine whether the FCC value is greater than a FCC value threshold,
wherein the memory management circuit is further configured to set a writing mode of the active physical unit as a first writing mode if the FCC value is greater than the FCC value threshold, wherein each memory cell constituting the active physical unit stores a bit data of a first number in the first writing mode, and
the memory management circuit is further configured to set the writing mode of the active physical unit as a second writing mode if the FCC value is not greater than the FCC value threshold, wherein each memory cell constituting the active physical unit stores a bit data of a second number in the second writing mode, wherein the first number is smaller than the second number.

12. The memory control circuit unit according to claim 11, wherein in the operation of recording the FCC value, the memory management circuit updates the FCC value whenever receiving a flush command from the host system.

13. The memory control circuit unit according to claim 12, wherein in the operation of recording the FCC value, the memory management circuit resets the FCC value after setting the writing mode of the active physical unit.

14. The memory control circuit unit according to claim 12, wherein in the operation of updating the FCC value, the memory management circuit adds 1 to the FCC value, and in the operation of resetting the FCC value, the memory management circuit sets the FCC value at 0.

15. The memory control circuit unit according to claim 12, wherein in the operation of getting the first physical erasing unit from the physical erasing units as the active physical unit, the memory management circuit gets a super physical unit constituted by the first physical erasing unit and at least another physical erasing unit from the physical erasing units as the active physical unit,
wherein in the operation of recording the FCC value, the memory management circuit resets the FCC value after the super physical unit is fully written.

16. The memory control circuit unit according to claim 11, wherein the memory management circuit is further configured to receive a write command and a write data corresponding to the write command from the host system and issue a sequence command to program the write data to the active physical unit according to the writing mode of the active physical unit.

17. The memory control circuit unit according to claim 11, wherein the memory management circuit is further configured to logically group the physical erasing units at least into a data area and a spare area,
wherein in the operation of getting the first physical erasing unit from the physical erasing units as the active physical unit, the memory management circuit gets the first physical erasing unit from the spare area as the active physical unit.

18. The memory control circuit unit according to claim 11, wherein each one of the physical erasing units further comprises a plurality of middle physical programming units.

19. The memory control circuit unit according to claim 11, wherein the memory management circuit is further configured to dynamically adjust the FCC value threshold according to a host write data amount and an actual programming data amount.

20. The memory control circuit unit according to claim 19, wherein in the operation of dynamically adjusting the FCC value threshold according to the host write data amount and the actual programming data amount, the memory management circuit lowers the FCC value threshold when a value obtained from dividing the actual programming data amount by the host write data amount increases.

21. A memory storage apparatus comprising:
a connection interface unit configured to couple to a host system;
a rewritable non-volatile memory module comprising a plurality of physical erasing units, wherein each one of the physical erasing units comprises a plurality of lower physical programming units and a plurality of upper physical programming units; and
a memory control circuit unit coupled to the connection interface unit and the rewritable non-volatile memory module, wherein the memory control circuit unit is configured to record a FCC value,
wherein the memory control circuit unit is further configured to get a first physical erasing unit from the physical erasing units as an active physical unit and determine whether the FCC value is greater than a FCC value threshold,
wherein the memory control circuit unit sets a writing mode of the active physical unit as a first writing mode and resets the FCC value if the FCC value is greater than the FCC value threshold, wherein each memory cell constituting the active physical unit stores a bit data of a first number in the first writing mode, and
the memory control circuit unit sets the writing mode of the active physical unit as a second writing mode and resets the FCC value if the FCC value is not greater than the FCC value threshold, wherein each memory cell constituting the active physical unit stores a bit data of a second number in the second writing mode, wherein the first number is smaller than the second number.

22. The memory storage apparatus according to claim 21, wherein in the operation of recording the FCC value, the memory control circuit unit updates the FCC value whenever receiving a flush command from the host system.

23. The memory storage apparatus according to claim 22, wherein in the operation of recording the FCC value, the memory control circuit unit resets the FCC value after setting the writing mode of the active physical unit.

24. The memory storage apparatus according to claim 22, wherein in the operation of updating the FCC value, the memory control circuit unit adds 1 to the FCC value, and in the operation of resetting the FCC value, the memory control circuit unit sets the FCC value at 0.

25. The memory storage apparatus according to claim 22, wherein in the operation of getting the first physical erasing unit from the physical erasing units as the active physical unit, the memory control circuit unit gets a super physical unit constituted by the first physical erasing unit and at least another physical erasing unit from the physical erasing units as the active physical unit,
wherein in the operation of recording the FCC value, the memory control circuit unit resets the FCC value after the super physical unit is fully written.

26. The memory storage apparatus according to claim 21, wherein the memory control circuit unit is further configured to receive a write command and a write data corresponding to the write command from the host system and issue a sequence command to program the write data to the active physical unit according to the writing mode of the active physical unit.

27. The memory storage apparatus according to claim 21, wherein the memory control circuit unit is further configured to logically group the physical erasing units at least into a data area and a spare area,
wherein in the operation of getting the first physical erasing unit from the physical erasing units as the active physical unit, the memory control circuit unit gets the first physical erasing unit from the spare area as the active physical unit.

28. The memory storage apparatus according to claim 21, wherein each one of the physical erasing units further comprises a plurality of middle physical programming units.

29. The memory storage apparatus according to claim 21, wherein the memory control circuit unit is further configured to dynamically adjust the FCC value threshold according to a host write data amount and an actual programming data amount.

30. The memory storage apparatus according to claim 29, wherein in the operation of dynamically adjusting the FCC value threshold according to the host write data amount and the actual programming data amount, the memory control circuit unit lowers the FCC value threshold when a value obtained from dividing the actual programming data amount by the host write data amount increases.

31. A data writing method for a rewritable non-volatile memory module, wherein the rewritable non-volatile memory module comprises a plurality of physical erasing units, the data writing method comprising:
recording a command counting value in response to receive a flush command;
getting a first physical erasing unit from the physical erasing units as an active physical unit;
setting a writing mode of the active physical unit as a first writing mode if the command counting value is greater than the command counting value threshold, wherein each memory cell constituting the active physical unit stores bit data of a first number in the first writing mode; and
setting the writing mode of the active physical unit as a second writing mode if the command counting value is not greater than the command counting value threshold, wherein each memory cell constituting the active physical unit stores bit data of a second number in the second writing mode, wherein the first number is different from the second number.

32. The data writing method according to claim 31, wherein the flush command is received from a host system.

33. The data writing method according to claim 31, wherein the command counting value is a flush command counting(FCC) value.

34. The data writing method according to claim 31, wherein the first number is smaller than the second number.

35. The data writing method according to claim 31, wherein the command counting value is used to count a frequency of executing the flush command.

* * * * *